(12) United States Patent
Kim

(10) Patent No.: US 11,177,560 B2
(45) Date of Patent: Nov. 16, 2021

(54) ANTENNA APPARATUS AND VEHICLE HAVING THE SAME

(71) Applicants: HYUNDAI MOTOR COMPANY, Seoul (KR); KIA MOTORS CORPORATION, Seoul (KR)

(72) Inventor: Dongjin Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 179 days.

(21) Appl. No.: 16/193,430

(22) Filed: Nov. 16, 2018

(65) Prior Publication Data

US 2019/0190138 A1    Jun. 20, 2019

(30) Foreign Application Priority Data

Dec. 20, 2017    (KR) ........................ 10-2017-0175639

(51) Int. Cl.
| | | |
|---|---|---|
| *H01Q 1/32* | (2006.01) | |
| *H01Q 19/02* | (2006.01) | |
| *H01Q 19/26* | (2006.01) | |
| *H01Q 1/48* | (2006.01) | |
| *H01Q 9/32* | (2006.01) | |
| *B62D 25/06* | (2006.01) | |
| *H01Q 1/40* | (2006.01) | |

(52) U.S. Cl.
CPC ........... *H01Q 1/3275* (2013.01); *B62D 25/06* (2013.01); *H01Q 1/32* (2013.01); *H01Q 1/40* (2013.01); *H01Q 1/48* (2013.01); *H01Q 9/32* (2013.01); *H01Q 19/021* (2013.01); *H01Q 19/26* (2013.01); *H01Q 1/3233* (2013.01)

(58) Field of Classification Search
CPC ...... H01Q 1/3275; H01Q 1/32; H01Q 19/021; H01Q 1/3233; H01Q 19/26; H01Q 9/32; H01Q 9/40; H01Q 1/48; B62D 25/06
See application file for complete search history.

(56) References Cited

U.S. PATENT DOCUMENTS

| | | | | |
|---|---|---|---|---|
| 6,693,600 | B1 * | 2/2004 | Elliot ...................... | H01Q 1/27 343/715 |
| 7,095,371 | B2 * | 8/2006 | Monebhurrun .......... | H01Q 9/16 343/700 MS |
| 8,836,588 | B2 * | 9/2014 | Hayashi ................. | H01Q 1/521 343/702 |
| 9,153,873 | B2 * | 10/2015 | Ng ......................... | H01Q 21/28 |
| 9,263,798 | B1 | 2/2016 | Piazza et al. | |
| 9,356,336 | B1 * | 5/2016 | Zheng ..................... | H01Q 7/00 |

(Continued)

FOREIGN PATENT DOCUMENTS

| | | |
|---|---|---|
| CN | 202308295 U | 7/2012 |
| JP | 2013-138321 A | 7/2013 |

(Continued)

*Primary Examiner* — Hai V Tran
(74) *Attorney, Agent, or Firm* — Morgan, Lewis & Bockius LLP

(57) ABSTRACT

A vehicle includes: a roof panel; an antenna disposed on an edge portion of one side the roof panel; and a vector transformer extending from the edge portion of one side of the roof panel to an outside of the roof panel. A surface area of the vector transformer may be smaller than that of the roof panel.

12 Claims, 20 Drawing Sheets

(56) References Cited

U.S. PATENT DOCUMENTS

| | | | |
|---|---|---|---|
| 2008/0100523 A1* | 5/2008 | Kim | H01Q 1/28 343/757 |
| 2008/0111752 A1* | 5/2008 | Lindackers | H01Q 21/28 343/713 |
| 2010/0039328 A1* | 2/2010 | Chiu | H01Q 9/42 343/700 MS |
| 2010/0090903 A1 | 4/2010 | Byun et al. | |
| 2010/0277379 A1* | 11/2010 | Lindackers | H01Q 1/3275 343/713 |
| 2011/0221640 A1* | 9/2011 | Huber | H01Q 1/1214 343/713 |
| 2012/0081253 A1* | 4/2012 | Duzdar | H01Q 21/28 343/713 |
| 2013/0002510 A1 | 1/2013 | Azulay et al. | |
| 2013/0229315 A1* | 9/2013 | Duzdar | H01Q 1/32 343/713 |
| 2014/0313080 A1* | 10/2014 | Smith | H01Q 19/32 342/372 |
| 2016/0104932 A1* | 4/2016 | Aminzadeh | H01Q 1/42 343/872 |

FOREIGN PATENT DOCUMENTS

| | | |
|---|---|---|
| KR | 10-0945550 B1 | 3/2010 |
| KR | 10-0958846 B1 | 5/2010 |
| KR | 10-1685540 B1 | 12/2016 |

\* cited by examiner

−PRIOR ART−

−PRIOR ART−

-PRIOR ART-

-PRIOR ART-

−PRIOR ART−

−PRIOR ART−

-PRIOR ART-

-PRIOR ART-

−PRIOR ART−

−PRIOR ART−

−PRIOR ART−

ANTENNA APPARATUS AND VEHICLE HAVING THE SAME

CROSS-REFERENCE TO RELATED APPLICATION(S)

This application is based on and claims priority under 35 U.S.C. § 119 to Korean Patent Application No. 10-2017-0175639, filed on Dec. 20, 2017, in the Korean Intellectual Property Office, the disclosure of which is incorporated by reference herein in its entirety.

TECHNICAL FIELD

The present disclosure relates to an antenna apparatus and a vehicle having the same, more particularly, to an antenna apparatus in which a plurality of antennas is integrally formed with each other, and a vehicle having the same.

BACKGROUND

A vehicle is a transportation means for driving in the road and railway using fossil fuel and electricity as a power source.

Recently, it has been common for the vehicle to include an audio device and a video device to allow a driver to listen to music and to watch a video, as well as to transport a cargo and people. Further, a navigation system has been widely installed in the vehicle to display a route to a destination that is desired by the driver.

Recently, there is a growing need for the vehicle to communicate with an external device. For example, in the case of a navigation function to guide the route to the destination, it is required to receive Global Positioning System (GPS) signals from GPS satellites to determine the location of the vehicle, and it is required to receive information about the traffic information of the road from a traffic infrastructure to find the optimal route.

As mentioned above, the vehicle is equipped with an antenna to communicate with external devices (or other vehicles) and to receive GPS signals.

An antenna is generally installed on the rear side of the roof panel of the vehicle for the design of the vehicle. However, since the antenna is installed on the rear side of the roof panel of the vehicle, the performance of the antenna may be degraded. For example, when a monopole antenna is installed on the rear side of the roof panel, the roof panel that functions as a ground plate may be asymmetric with respect to the monopole antenna, thereby reducing the performance of monopole antenna.

SUMMARY

An aspect of the present disclosure provides a vehicle having a monopole antenna.

It is another aspect of the present disclosure to provide an antenna apparatus capable of maintaining the performance even when a monopole antenna is installed in a rear side of a roof panel.

Additional aspects of the present disclosure will be set forth in part in the description which follows and, in part, will be obvious from the description, or may be learned by practice of the present disclosure.

In accordance with one aspect of the present disclosure, a vehicle includes: a roof panel; an antenna disposed on an edge portion of one side the roof panel; and a vector transformer extending from the edge portion of one side of the roof panel to the outside of the roof panel. A surface area of the vector transformer may be smaller than that of the roof panel.

The vector transformer may be extended upward from the roof panel at a predetermined angle.

The vector transformer may have a trapezoidal shape in which an upper side and a base side are different.

At least one part of the vector transformer may be overlapped with the roof panel.

An electrical mirror image of the antenna may be generated on the roof panel and the vector transformer.

The antenna may be extended from an edge portion of the roof panel to a direction perpendicular to the roof panel.

An electric field in the antenna may be generated in a direction in which the antenna is extended and a magnetic field rotating around the antenna is generated.

A radiation pattern of the antenna may be the same as a radiation pattern of a monopole antenna.

The vector transformer may be extended in the same plane as the roof panel.

In accordance with another aspect of the present disclosure, an antenna apparatus includes: a ground plate; an antenna disposed on an edge portion of one side the ground plate; and a vector transformer extending from the edge portion of one side of the ground plate to an outside of the ground plate. A surface area of the vector transformer may be smaller than that of the ground plate.

The vector transformer may be extended upward from the ground plate at a predetermined angle.

The vector transformer may have a trapezoidal shape in which an upper side and a base side are different.

At least one part of the vector transformer may be overlapped with the ground plate.

An electrical mirror image of the antenna may be generated on the ground plate and the vector transformer.

The antenna may be extended from an edge portion of the ground plate to a direction perpendicular to the ground plate.

An electric field in the antenna may be generated in a direction in which the antenna is extended and a magnetic field rotating around the antenna is generated.

A radiation pattern of the antenna may be the same as a radiation pattern of a monopole antenna.

The vector transformer may be extended in the same plane as the ground plate.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
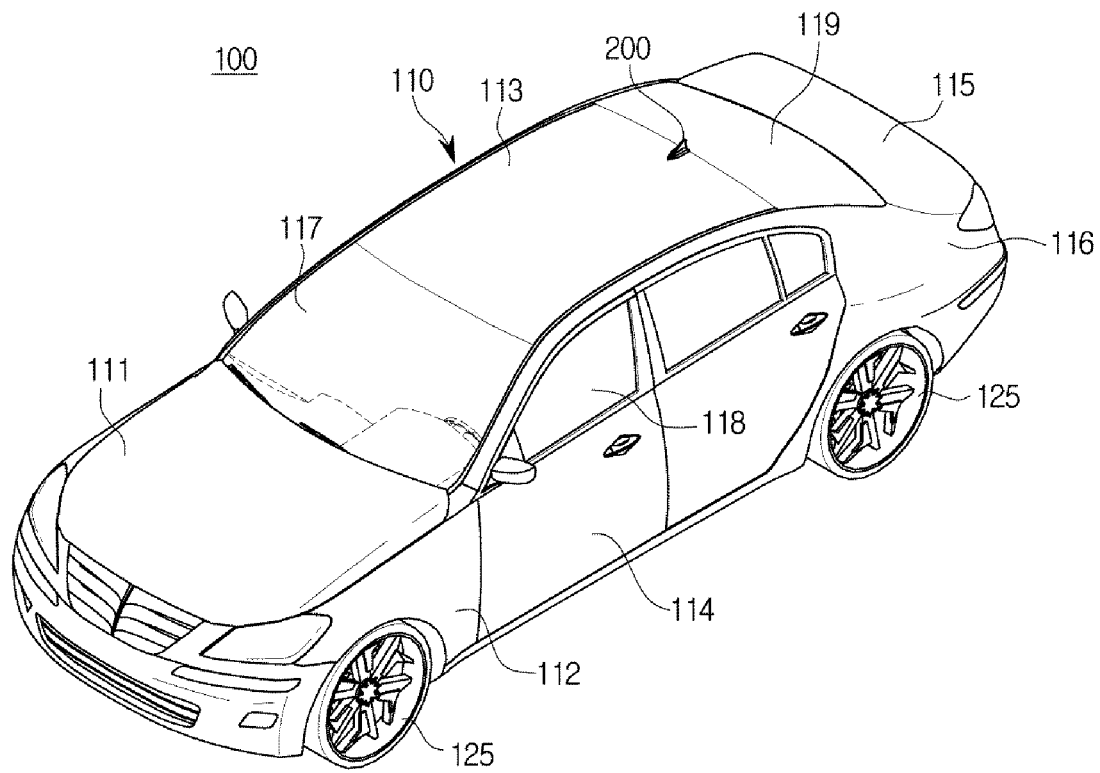
FIG. 1 is a view illustrating a body of a vehicle according to an exemplary embodiment of the present disclosure.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Reference will now be made in detail to embodiments of the present disclosure, examples of which are illustrated in the accompanying drawings.

Figure 2:
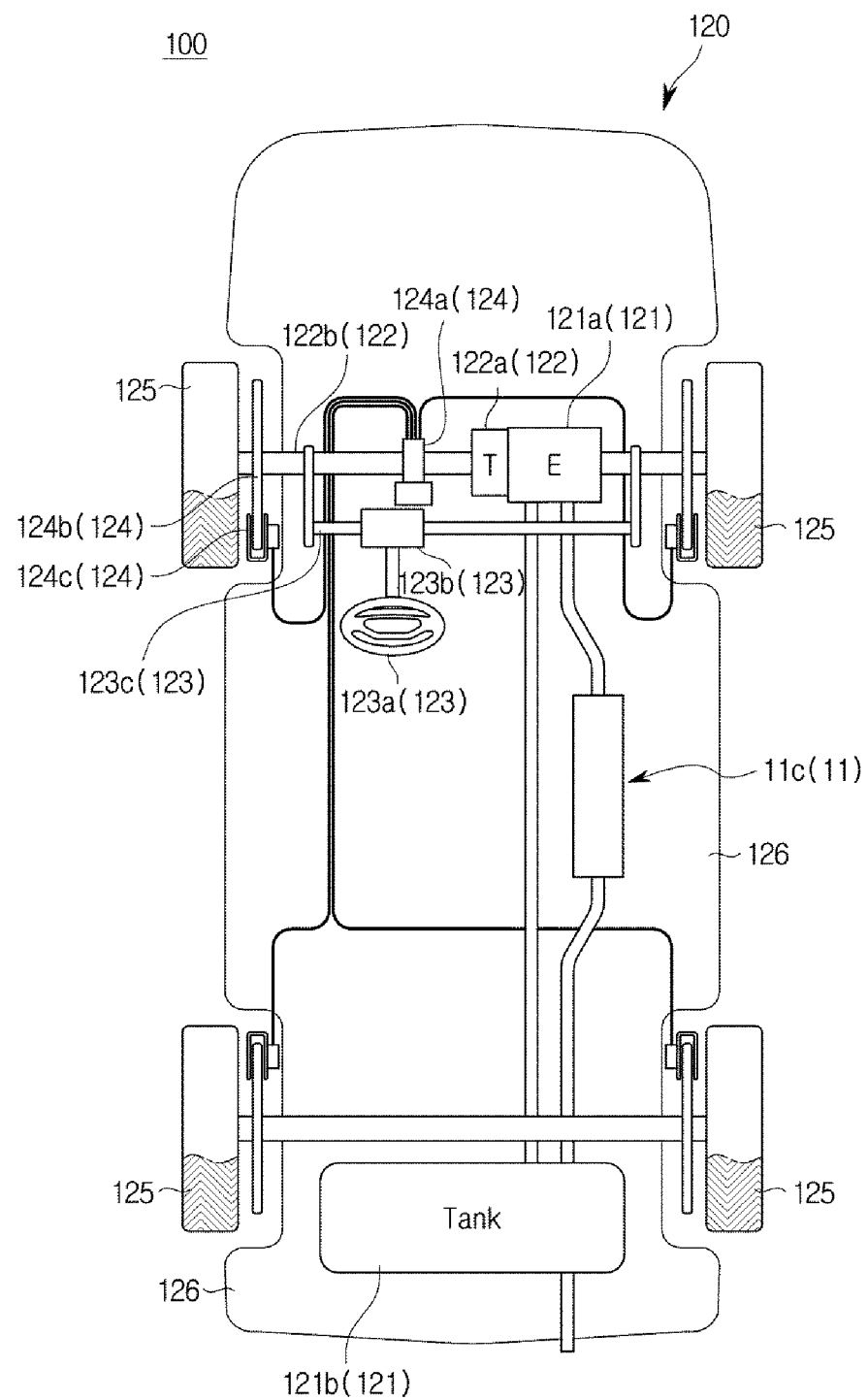
FIG. 2 is a view illustrating a chassis of the vehicle according to an exemplary embodiment of the present disclosure.
Figure 3:
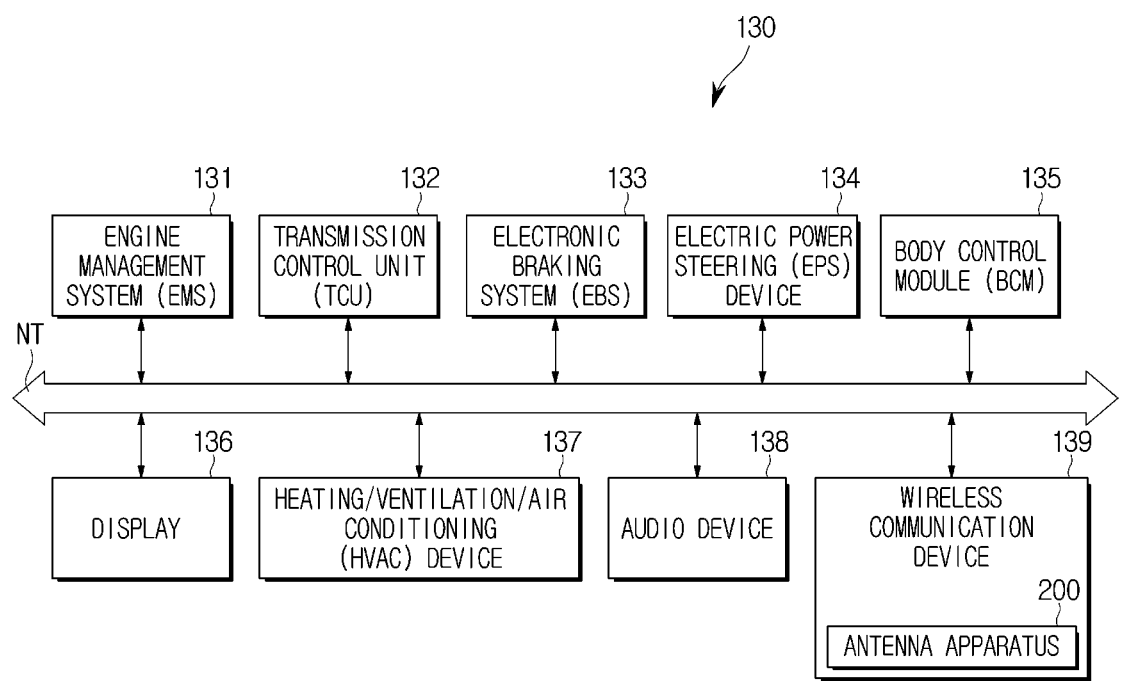
FIG. 3 is a view illustrating electrical components of the vehicle according to an exemplary embodiment of the present disclosure.

FIG. 1 is a view illustrating a body of a vehicle according to an exemplary embodiment of the present disclosure. FIG. 2 is a view illustrating a chassis of the vehicle according to an exemplary embodiment of the present disclosure. FIG. 3 is a view illustrating electrical components of the vehicle according to an exemplary embodiment of the present disclosure.

Referring to FIGS. 1 to 3, a vehicle 100 may include a body 110 forming an exterior of the vehicle 1 and accommodating a driver and/or baggage, a chassis 120 including components of the vehicle 100 except the body 110, and electrical components 130 protecting a driver and providing the convenience to the driver.

Referring to FIG. 1, the body 110 may form an indoor space in which a driver is placed, an engine room in which an engine is placed, and a trunk room in which baggage is placed.

The body 110 may include a hood 111, a front fender 112, a roof panel 113, a door 114, a trunk lid 115, and a quarter panel 116. To provide a view to a driver, a front window 117 may be installed in the front side of the body 110 and a side window 118 may be installed in a lateral side of the body 110. Further, a rear window 119 may be installed in the rear side of the body 110.

Referring to FIG. 2, in order to drive the vehicle 100 according to driver's control, the chassis 120 may include a power system 121, a power train 122, a steering system 123, a brake system 124, a vehicle wheel 125, and a frame 126.

The power system 121 may be configured to generate a torque to drive the vehicle 100 according to the acceleration control of the driver and include an engine 121a, a fuel device 121b, an exhaust system 121c, and an acceleration pedal.

The power train 122 may be configured to transmit the torque generated by the power system 121 to the vehicle wheel 125 and include a clutch/transmission 122a, a drive shaft 122b, and a shift lever.

The steering system 123 may be configured to change a driving direction of the vehicle 100 according to the steering control of the driver and include a steering wheel 123a, a steering gear 123b, and a steering link 123c.

The brake system 124 may be configured to stop a driving of the vehicle 100 according to the brake control of the driver and include a master cylinder 124a, a brake disk 124b, and a brake pad 124c and a brake pedal.

The vehicle wheel 125 may receive the torque from the power system 121 through the power train 122 and move the vehicle 100. The vehicle wheel 125 may include a front wheel provided in the front side of the vehicle, and a rear wheel provided in the rear side of the vehicle.

The frame 126 may fix the power system 121, the power train 122, the steering system 123, the brake system 124, and the vehicle wheel 125.

For the control of the vehicle 100 and the safety and convenience of the passenger and the driver, the vehicle 100 may include a variety of electrical components 130 of the vehicle 100, as well as the above mentioned mechanical devices.

Referring to FIG. 3, the vehicle 100 may include an engine management system (EMS) 131, a transmission control unit (TCU) 132, an electronic braking system (EBS) 133, an electric power steering (EPS) device 134, a body control module (BCM) 135, a display 136, a heating/ventilation/air conditioning (HVAC) device 137, an audio device 138, and a wireless communication device 139.

The engine management system 131 may control the operation of the engine and manage the engine in response to the driver's acceleration command through the accelerator pedal. For example, the engine management system 131 may perform engine torque control, fuel consumption control, engine failure diagnosis, and/or generator control.

The transmission control unit 132 may control the operation of the transmission in response to the shift command of the driver through the shift lever or the driving speed of the vehicle 100. For example, the transmission control unit 132 may perform clutch control, shift control, and/or engine torque control during a shift.

The electronic braking system 133 may control the braking device of the vehicle 1 in response to the driver's braking command through the braking pedal and maintain the balance of the vehicle 100. For example, the electronic braking system 133 may perform automatic parking braking, slip prevention during braking, and/or slip prevention during steering.

The electric power steering device 134 may assist the driver so that the driver can easily operate the steering wheel 123a. For example, the electric power steering device 134 may assist the driver in steering operations such as reducing the steering force during low-speed driving or parking, and increasing the steering force during high-speed driving.

The body control module 135 may control the operation of the electric components that provide convenience to the driver or ensure the safety of the driver. For example, the body control module 135 may control a door lock device, a head lamp, a wiper, a power seat, a seat heater, a cluster, a room lamp, a navigation device, and a multifunctional switch.

The display 136 may be installed in the center fascia inside the vehicle 100 and provide various information and fun to the driver through an image. For example, the display 136 may reproduce a video file stored in an internal storage medium or an external storage medium according to a command from the driver, and output an image included in the video file. In addition, the display 136 may receive the destination from the driver through the touch input of the driver, and may display the route to the input destination.

The heating/ventilation/air conditioning (HVAC) device 137 may heat or cool the indoor air according to an indoor temperature of the vehicle 100 and a target temperature inputted by the driver. For example, the heating/ventilation/air conditioning (HVAC) device 137 may cool indoor air when an indoor temperature is higher than the target temperature, and may heat the indoor air when the indoor temperature is lower than the target temperature. The heating/ventilation/air conditioning (HVAC) device 137 may introduce air from the outside of the vehicle 100 into the inside of the vehicle 100 or circulate the internal air of the vehicle 100 by blocking the introduction of the external air.

The audio device 138 may provide various information and fun to the driver through the sound. For example, the audio device 138 may reproduce an audio file stored in an internal storage medium or an external storage medium according to a command from the driver, and output sound contained in the audio file. In addition, the audio device 138 may receive an audio broadcast signal and output a sound corresponding to the received audio broadcast signal.

The wireless communication device 139 may communicate with another vehicle, a user's terminal or a communication relay device through a wireless communication technology. The wireless communication device 139 may be used for a vehicle to vehicle communication (V2V communication), a vehicle to infrastructure communication (V2I communication), a vehicle to nomadic devices communication (V2N communication), and a vehicle to grid communication (V2G communication)

The wireless communication device 139 may transmit and receive a signal by using a variety of communication protocols. For example, the wireless communication device 139 may employ 2G communication method, e. g. Time Division Multiple Access (TDMA) and Code Division Multiple Access (CDMA), 3G communication method, e. g. Wide Code Division Multiple Access (WCDMA), Code Division Multiple Access (CDMA) 2000, Wireless Broadband (Wibro), and World Interoperability for Microwave Access (WiMAX), and 4G communication method, e. g. Long Term Evolution (LTE) and Wireless Broadband Evolution. In addition, the wireless communication device 139 may employ 5G communication method.

The wireless communication device 139 may include an antenna apparatus 200 configured to transmit and receive a radio signal to and from other vehicle, a user terminal or a telegraphic repeater. As illustrated in FIG. 1, the antenna apparatus 200 may be installed on the rear side of the roof panel 113 or the trunk lid 115, and the antenna apparatus 200 may include a monopole antenna.

In addition, in order to provide convenience to the driver or ensure the safety of the driver of the vehicle 100, the vehicle 100 may further include electrical components. For example, the vehicle 100 may include electrical components 130 such as a door lock device, a head lamp, a wiper, a power seat, a seat heater, a cluster, a room lamp, a navigation device, and a multifunctional switch.

The electrical components 130 may communicate with each other via a vehicle communication network (NT). For example, the electrical components 30 may send and receive data through Ethernet, Media Oriented Systems Transport (MOST), FlexRay, Controller Area Network (CAN), and Local Interconnect Network (LIN).

As mentioned above, the vehicle 100 may include the antenna apparatus 200 for communication with external devices and other vehicles.

Figure 4:
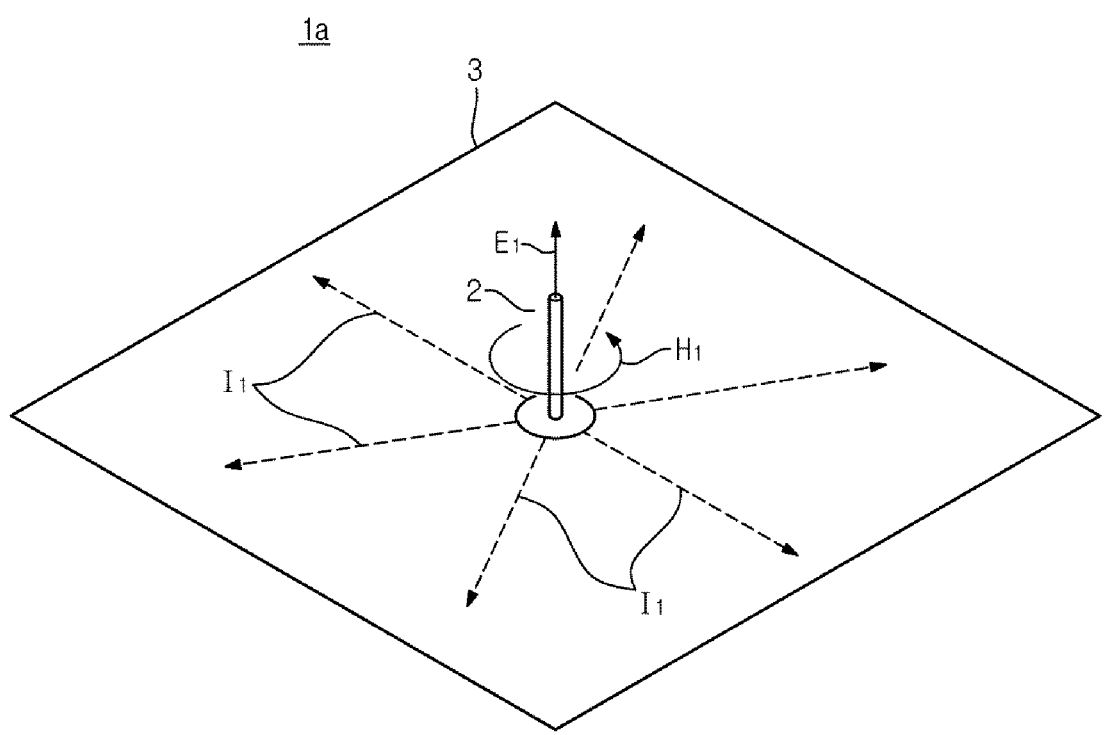
FIG. 4 is a view illustrating a monopole antenna according to a conventional art.
Figure 5A:
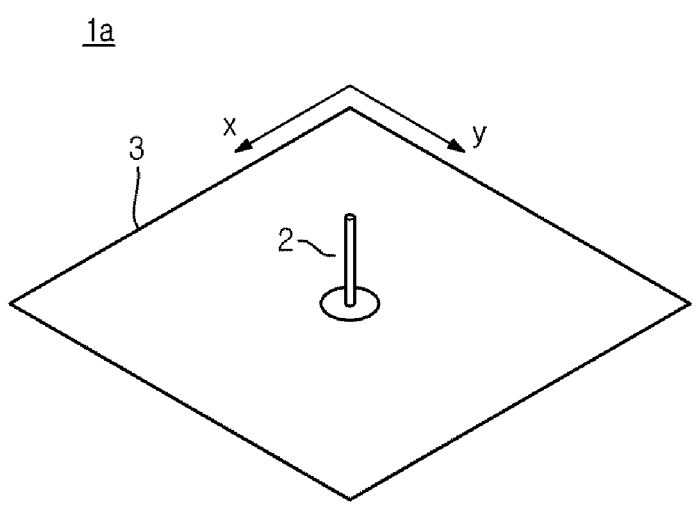
FIGS. 5A-5C are views illustrating a radiation pattern of the monopole antenna shown in FIG. 4.
Figure 5B:
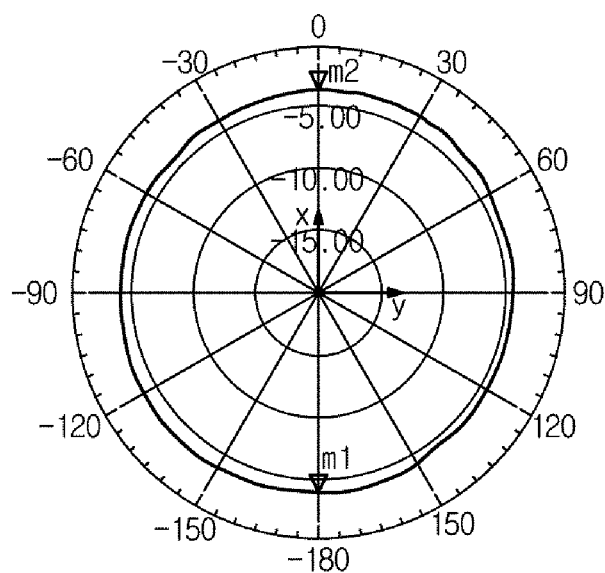
Figure 5C:
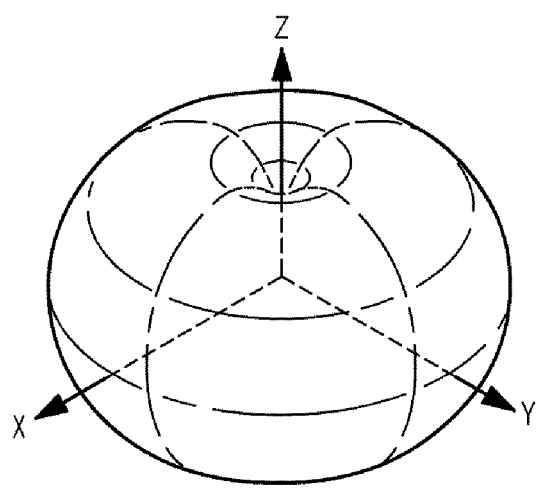

FIG. 4 is a view illustrating a monopole antenna according to the conventional manner. FIGS. 5A-5C are views illustrating a radiation pattern of the monopole antenna shown in FIG. 4.

As illustrated in FIG. 4, the monopole antenna 1a according to the conventional manner may include an antenna 2 configured to transmit and receive radio signals, and a ground plate 3 configured to generate an electrical mirror image of the antenna 2.

The antenna 2 may transmit and receive radio signals by being formed of a conductive material through which electric power can pass, and the antenna 2 may be disposed at the center portion of the ground plate 3.

The ground plate 3 may generate an electrical mirror image of the antenna 2 by being formed of a conductive material through which electric power can pass.

An electrical signal may be supplied to the antenna 2 to transmit a radio signal. Accordingly, a flow of charge, that is, a current, may be generated in the antenna 2.

A charge of the ground plate 3 may be induced by a charge of the antenna 2, and a flow of charge, that is, a current $I_1$, may be generated in the ground plate 3 due to the flow of the charge of the antenna 2. The current $I_1$ of the ground plate 3 may flow in all directions in a radial pattern with respect to the antenna 2, as illustrated in FIG. 4.

An electric field $E_1$ may be generated by the current $I_1$ of the ground plate 3. As illustrated in FIG. 4, the electric field $E_1$ may be generated in a direction the same as a direction in which the antenna 2 is extended.

A magnetic field $H_1$ may be generated by the electric field $E_1$ As illustrated in FIG. 4, the magnetic field $H_1$ may be rotated with respect to the electric field $E_1$ In other words, the magnetic field $H_1$ may surround around the antenna 2.

A radio signal including the electric field $E_1$ and the magnetic field $H_1$ may be radiated to a free space. The radio signal may be radiated in a direction of the electric field $E_1$ and a direction of the magnetic field $H_1$, as illustrated in FIG. 4.

A radiation pattern of the monopole antenna 1a as illustrated in FIG. 5A may be the same as FIGS. 5B and 5C.

As illustrated in FIGS. 5B and 5C, the monopole antenna 1a may evenly radiate a radio signal in all directions on a xy plane. When the monopole antenna 1a is mounted on the roof panel 113 or the trunk lid 115 of the vehicle 100, the monopole antenna 1a may evenly radiate a radio signal to a front, rear, left, and right direction of the vehicle 100.

Figure 6:
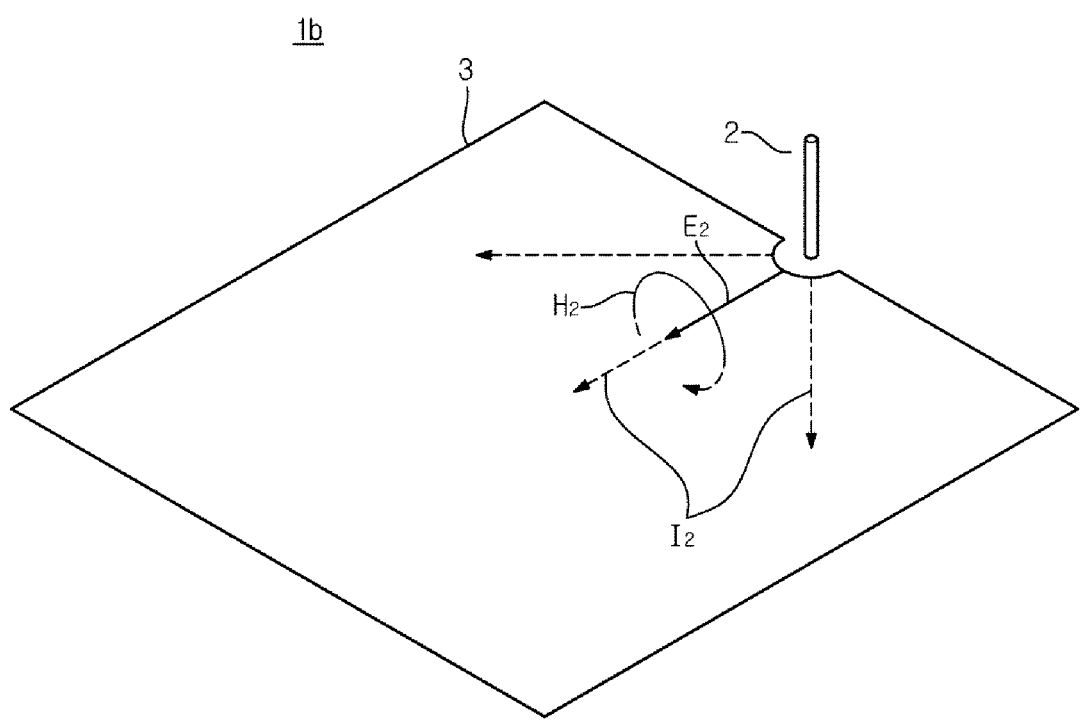
FIG. 6 is a view illustrating another example of a monopole antenna according to a conventional art.

FIG. 6 is a view illustrating another example of a monopole antenna according to the conventional manner. FIG. 7 is a view illustrating a radiation pattern of the monopole antenna shown in FIG. 6.

As illustrated in FIG. 6, a monopole antenna 1b may include an antenna 2 and a ground plate 3, wherein the antenna 2 may be disposed on an edge portion of one side of the ground plate 3 and the ground plate 3 may generate an electrical mirror image.

A charge of the ground plate 3 may be induced by a charge of the antenna 2, and a flow of charge, that is, a current $I_2$, may be generated in the ground plate 3 due to the flow of the charge of the antenna 2.

As illustrated in FIG. 6, the current $I_2$ of the ground plate 3 may flow to a semicircle side in a radial pattern with respect to the antenna 2. Particularly, the current $I_2$ of the ground plate 3 may flow from the antenna 2 disposed in an edge portion of the ground plate 3, toward the center portion of the ground plate 3.

An electric field $E_2$ may be generated by the current $I_2$ of the ground plate 3. As illustrated in FIG. 6, the electric field $E_2$ may be generated toward the center portion of the ground plate 3.

A magnetic field $H_2$ may be generated by the electric field $E_2$. As illustrated in FIG. 6, the magnetic field $H_2$ may be rotated with respect to the electric field $E_2$. In other words, the magnetic field $H_2$ may be rotated with respect to the electric field $E_2$ generated along the ground plate 3.

In addition, a radio signal including the electric field $E_2$ and the magnetic field $H_2$ may be radiated to a free space. The radio signal may be radiated in a direction of the electric field $E_2$ and a direction of the magnetic field $H_2$, as illustrated in FIG. 6.

Figure 7A:
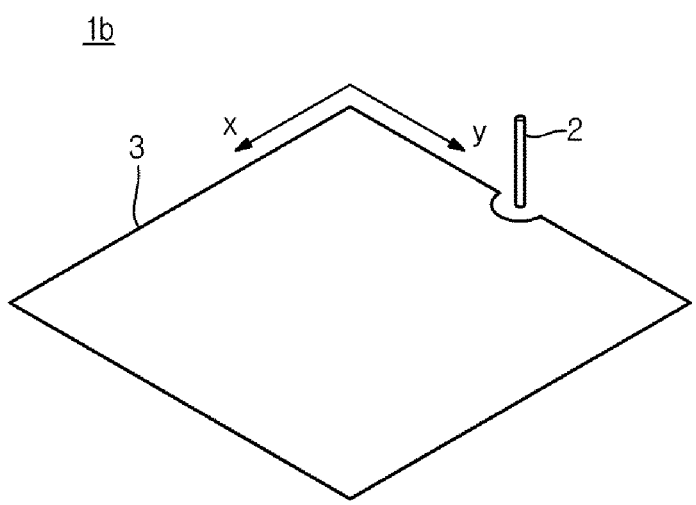
FIGS. 7A-7C are views illustrating a radiation pattern of the monopole antenna shown in FIG. 6.
Figure 7B:
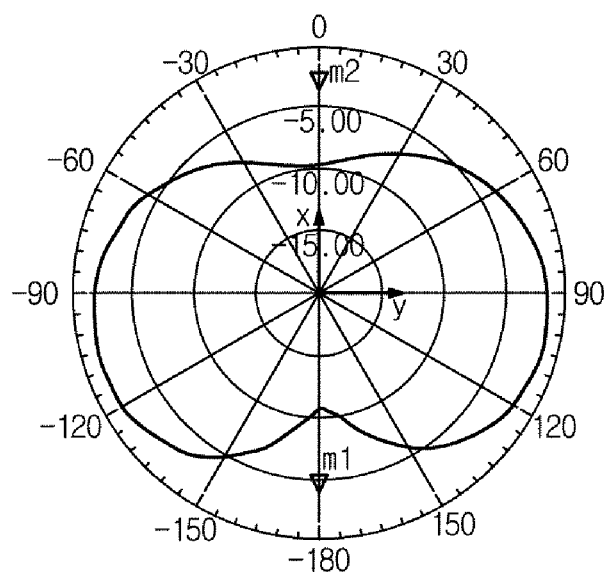
Figure 7C:
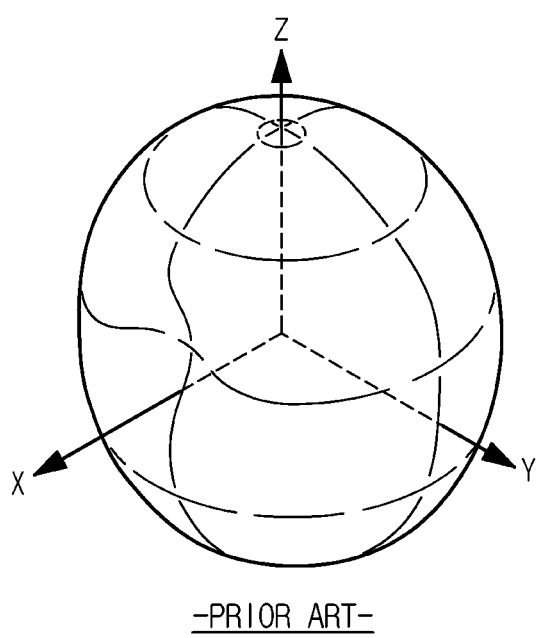

A radiation pattern of the monopole antenna 1b as illustrated in FIG. 7A may be the same as FIGS. 7B and 7C.

As illustrated in FIGS. 7B and 7C, the monopole antenna 1b may unevenly radiate a radio signal on a xy plane. Particularly, the radio signal may be radiated more widely to the y-axis direction than the x-axis direction. When the monopole antenna 1b is mounted on the roof panel 113 or the trunk lid 115 of the vehicle 100, the monopole antenna 1b may radiate a radio signal more widely to the left and right side of the vehicle 100 than the front and rear side of the vehicle 100.

Figure 8:
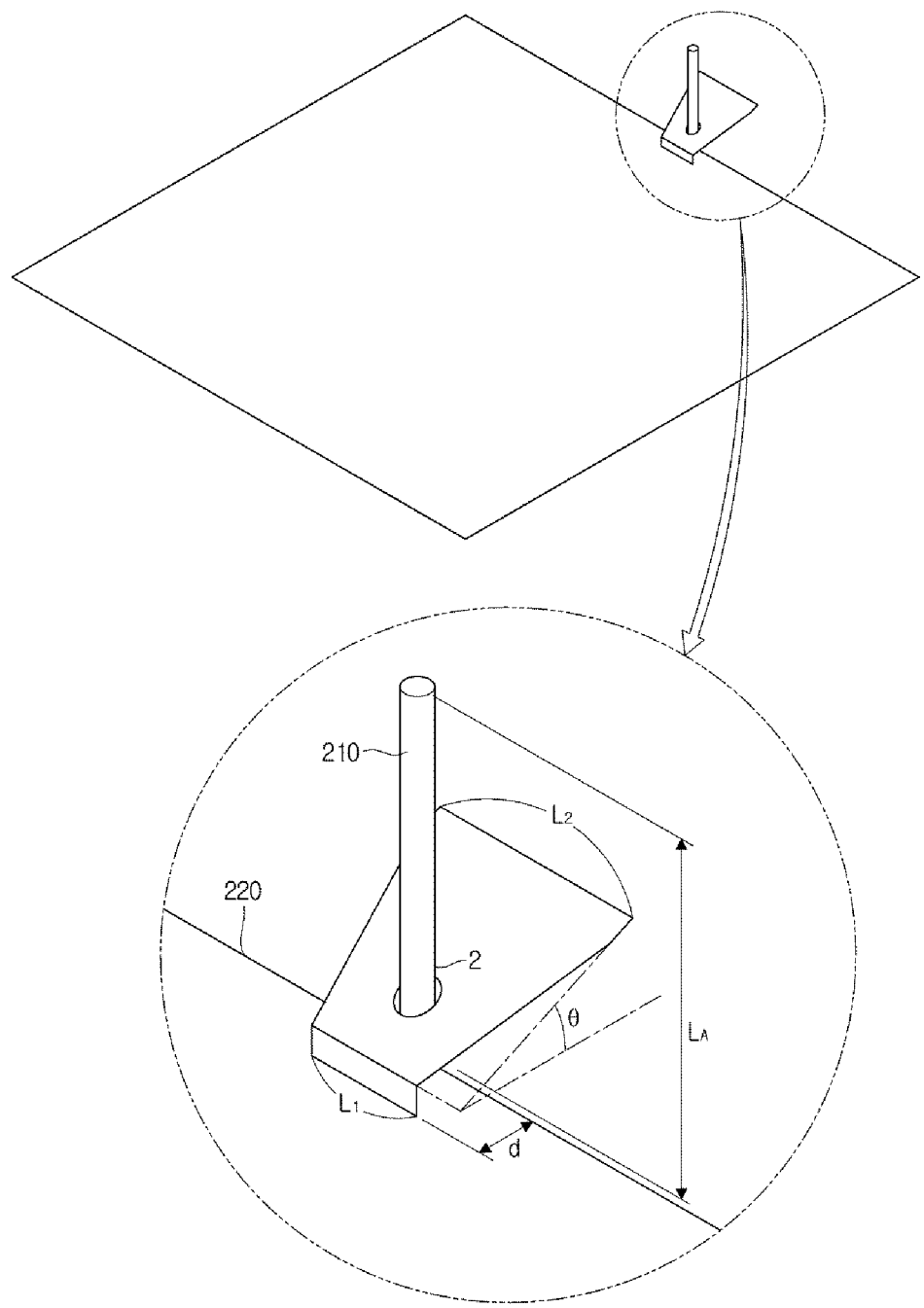
FIG. 8 is a view illustrating an antenna apparatus according to an exemplary embodiment of the present disclosure.
Figure 9:
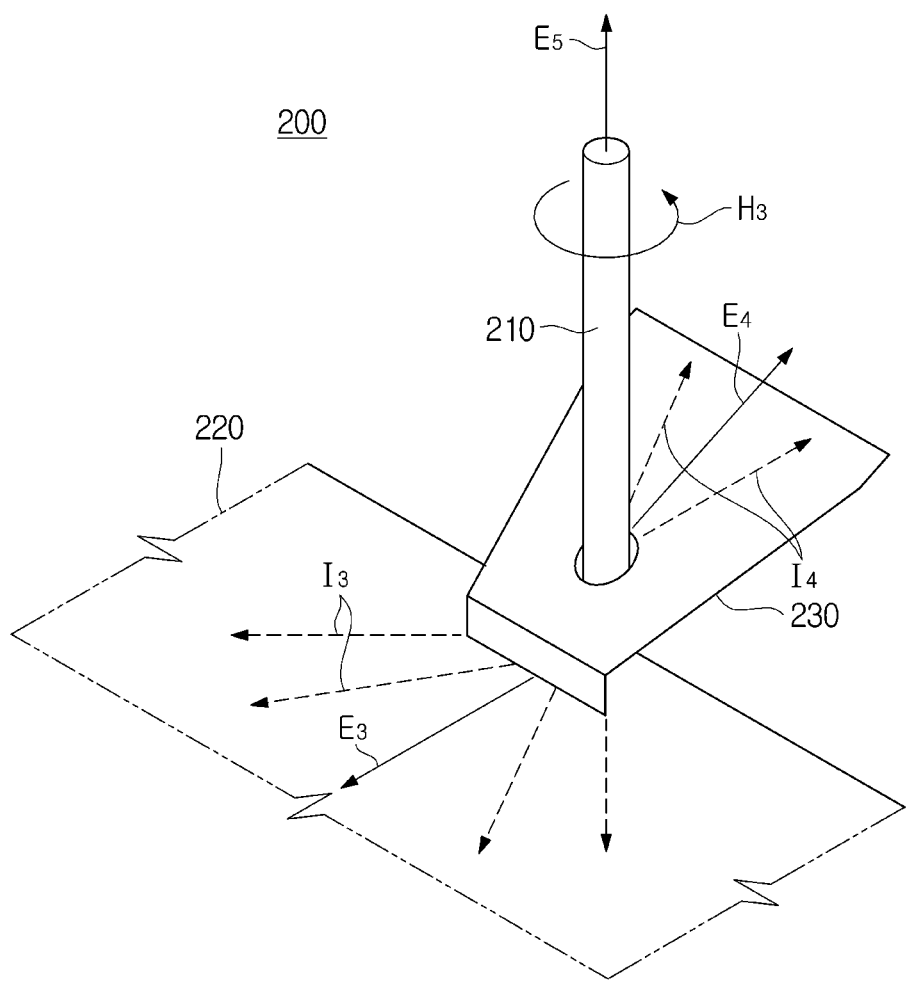
FIG. 9 is a view illustrating an operation of antenna apparatus according to an exemplary embodiment of the present disclosure.

FIG. 8 is a view illustrating an antenna apparatus according to an exemplary embodiment of the present disclosure. FIG. 9 is a view illustrating an operation of antenna apparatus according to an exemplary embodiment of the present disclosure. FIG. 10 is a view illustrating a radiation pattern of the antenna apparatus shown in FIG. 8.

As illustrated in FIG. 8, the antenna apparatus 200 may have the form of a monopole antenna.

The antenna apparatus 200 may include an antenna 210 configured to transmit and receive radio signals, a ground plate 220 configured to generate an electrical mirror image of the antenna 210, and a vector transformer 230 configured to complement the ground plate 220.

The antenna 210 may be formed of a conductive material through which electric power can pass, and the antenna 210 may be electrically connected to the wireless communication device 139.

The antenna 210 may transmit and receive radio signals. For example, the antenna 210 may receive a radio signal from the free space and transmit an electric signal corresponding to the received radio signal, to the wireless communication device 139. In addition, the antenna 210 may receive an electric signal from the wireless communication device 139 and transmit a radio signal corresponding to the received electric signal to the free space.

The antenna 210 may be installed on one side of the ground plate 220. For example, the antenna 210 may be installed at an edge portion of the ground plate 220.

The antenna 210 may have a straight bar shape extending in a direction perpendicular to the ground plate 220. A length $L_A$ of the antenna 210 may depend on a wavelength of the radio signal. For example, the length of the antenna 210 may be ¼ ($\lambda/4$, $\lambda$ is the wavelength of the radio signal) of the wavelength of the radio signal.

The ground plate 220 may be formed of a conductive material through which electricity can pass, and the ground plate 220 may be electrically connected to a ground plane of the vehicle 100 (e.g., the roof panel 113 or the trunk lid 115 of the vehicle 100).

The ground plate 220 may generate an electrical mirror image of the antenna 210. In other words, a charge of the ground plate 220 may be induced by a charge of the antenna 210. For example, a positive and/or negative charge may be generated in the antenna 210 due to the electric signal. A positive and/or negative charge may be induced in the ground plate 220 by the positive and/or negative charge of the antenna 210.

Since the electrical mirror image of the antenna 210 is generated in the ground plate 220, a length of the antenna 210 may be doubled (i.e., a length of the antenna is increased to ½ of the wavelength of the radio signal).

As described above, the antenna 210 may be installed at an edge portion of the ground plate 220. A part of the electrical mirror image of the antenna 210 may be generated in the antenna apparatus 200, which is different from the monopole antenna in the conventional manner. Therefore, characteristics of the antenna apparatus 200 that is a monopole antenna may be distorted or changed.

The vector transformer 230 may compensate the distortion and change of the characteristics of the antenna apparatus 200, wherein the distortion and change occur since the antenna 210 is installed in the edge portion of the ground plate 220. Particularly, the electrical mirror image of the antenna 210 may be generated in the vector transformer 230.

As illustrated in FIG. 8, the vector transformer 230 may be extended from the edge portion of the ground plate 220 toward the opposite side of the ground plate 220. Accordingly, an entire electrical mirror image of the antenna 210 may be generated in the ground plate 220 and the vector transformer 230.

The vector transformer 230 may have a size smaller than a size of the ground plate 220. For example, as illustrated in FIG. 8, the vector transformer 230 may have a trapezoidal shape in which a length $L_2$ of the upper side is longer than a length $L_1$ of the base side. The length $L_2$ of the upper side and the length $L_1$ of the base side may vary according to the wavelength (frequency) of the radio signal and/or the radiation characteristics of the antenna apparatus 200.

However, the shape of the vector transformer 230 shown in FIG. 8 is merely an example, and thus, the vector transformer 230 may have a variety of shapes such as a triangle, a rectangle, and a pentagon.

The base of the vector transformer 230 may be located inside the ground plate 220 by a predetermined distance d. In other words, the vector transformer 230 may be extended toward the outside of the ground plate 220 from a position, which is apart from the end of the ground plate 220 by the predetermined distance d.

The distance d between the end of the ground plate 220 and the position of the vector transformer 230 may vary according to the wavelength (frequency) of the radio signal and/or the radiation characteristics of the antenna apparatus 200.

The vector transformer 230 may be extended upward from the ground plate 220 at a predetermined angle θ. In other words, an angle between the vector transformer 230 and the ground plate 220 may be the predetermined angle θ.

The angle θ between the vector transformer 230 and the ground plate 220 may vary according to the wavelength (frequency) of the radio signal and/or the radiation characteristics of the antenna apparatus 200.

An electrical signal may be supplied to the antenna 210 to transmit a radio signal. Accordingly, a flow of charge, that is, a current, may be generated in the antenna 210.

A charge of the ground plate 220 may be induced by a charge of the antenna 210, and a flow of charge, that is, a first current $I_3$, may be generated in the ground plate 220 due to the flow of the charge of the antenna 210. The first current $I_3$ of the ground plate 220 may flow to a semicircle side in the radial pattern with respect to the antenna 210.

A first electric field $E_3$ may be generated by the first current $I_3$ of the ground plate 220. As illustrated in FIG. 9, the first electric field $E_3$ may be generated toward the center portion of the ground plate 220 from the antenna 210.

A charge of the vector transformer 230 may be induced by a charge of the antenna 210, and a flow of charge, that is, a second current $I_4$, may be generated in the vector transformer 230. The second current $I_4$ of vector transformer 230 may flow to a semicircle side in the radial pattern with respect to the antenna 210, as illustrated in FIG. 9.

A second electric field $E_4$ may be generated by the second current $I_4$ of the vector transformer 230. As illustrated in FIG. 9, the second electric field $E_4$ may be generated in a direction in which the vector transformer 230 is extended, from the antenna 210.

A third electric field $E_5$ may be generated by combining the first electric field $E_3$ of the ground plate 220 and the second electric field $E_4$ of the vector transformer 230. A size and direction of the third electric field $E_5$ may be the same as a size and direction of the sum of the first electric field $E_3$ and the second electric field $E_4$.

The third electric field $E_5$ may be generated in a direction the same as a direction in which the antenna 210 is extended.

A magnetic field $H_3$ may be formed by the third electric field $E_5$. As illustrated in FIG. 9, the magnetic field $H_3$ may be rotated with respect to the third electric field $E_5$. In other words, the magnetic field $H_3$ may surround around the antenna 210.

A radio signal including the third electric field $E_5$ and the magnetic field $H_3$ may be radiated to a free space. The radio signal may be radiated in a direction of the third electric field $E_5$ and a direction of the magnetic field $H_3$, as illustrated in FIG. 9.

Figure 10A:
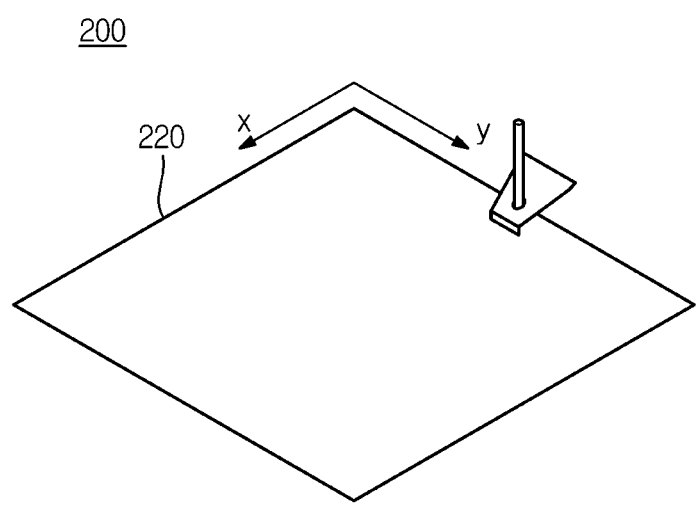
FIGS. 10A-10C are views illustrating a radiation pattern of the antenna apparatus shown in FIG. 8.
Figure 10B:
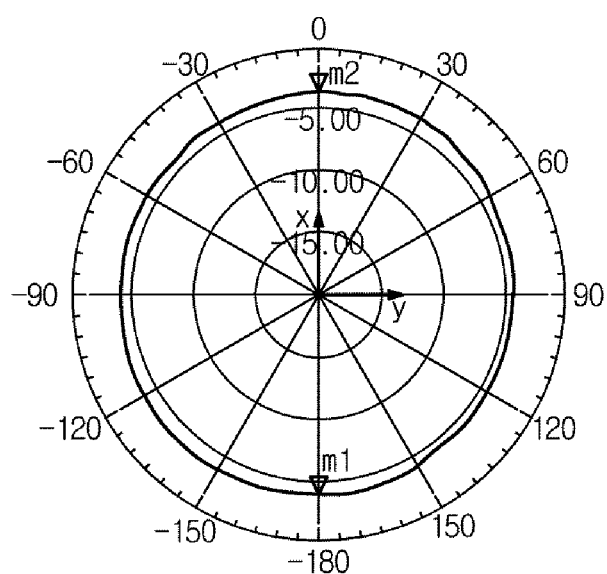
Figure 10C:
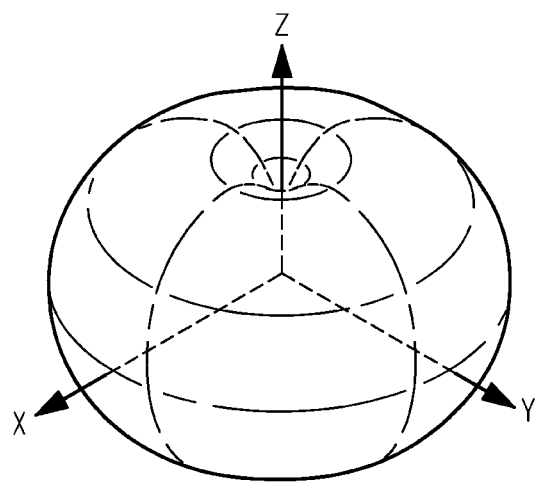

A radiation pattern of the antenna apparatus 200 as illustrated in FIG. 10A may be the same as FIGS. 10B and 10C.

As illustrated in FIGS. 10B and 10C, the antenna apparatus 200 may evenly radiate a radio signal in all directions on a xy plane. In other words, the radiation pattern of the antenna apparatus 200 may be the same as the radiation pattern of the monopole antenna 1a as illustrated in FIGS. 4 and 5.

When the antenna apparatus 200 is mounted on the roof panel 113 or the trunk lid 115 of the vehicle 100, the antenna apparatus 200 may evenly radiate a radio signal to a front, rear, left, and right direction of the vehicle 100.

As mentioned above, the antenna 210 may be disposed in the edge portion of the ground plate 220 (the roof panel or the trunk lid) and the vector transformer 230 may be disposed to be extended from the edge portion of the ground plate 220 to the outside of the ground plate 220. By the vector transformer 230, the antenna apparatus 200 may have the same radiation characteristics as the monopole antenna.

Figure 11A:
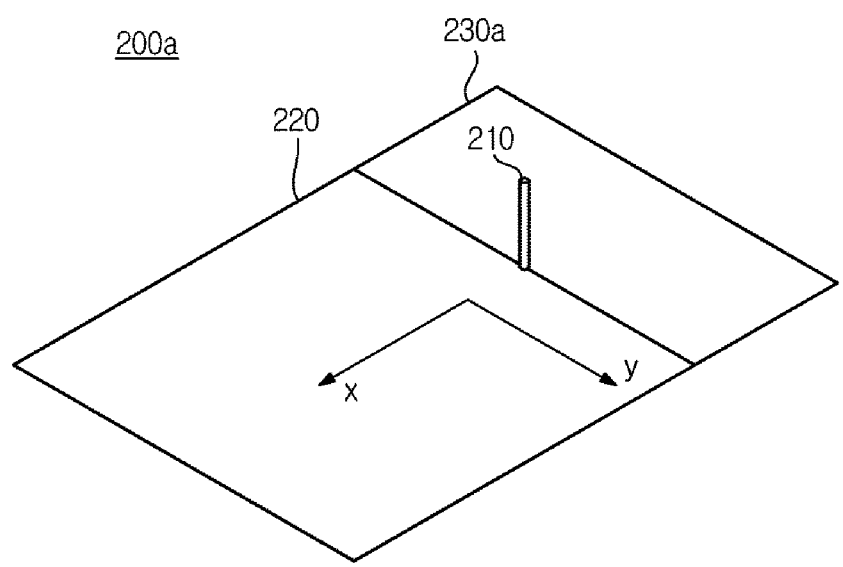
FIGS. 11A and 11B are views illustrating another example of the antenna apparatus according to an exemplary embodiment of the present disclosure.
Figure 11B:
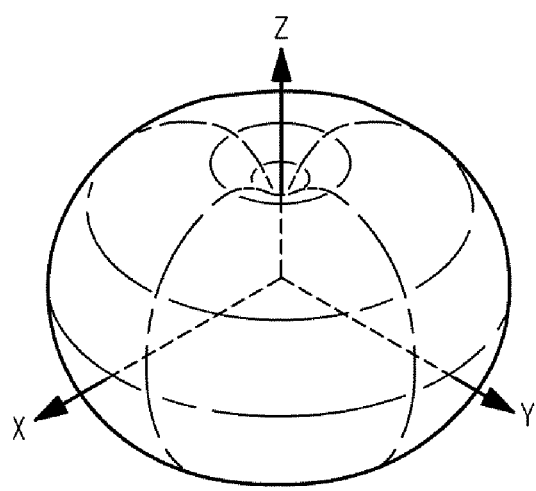

FIGS. 11A and 11B are views illustrating another example of the antenna apparatus according to an exemplary embodiment of the present disclosure.

As illustrated in FIG. 11A, an antenna apparatus 200a may include an antenna 210, a ground plate 220 and a first vector transformer 230a.

The antenna 210 may transmit and receive a radio signal by being connected to the wireless communication device 139, and the ground plate 220 may provide a ground plane to the antenna 210 by being connected to a ground plane of the vehicle 100. In addition, the ground plate 220 may correspond to the roof panel 113 or the trunk lid 115 of the vehicle 100.

The first vector transformer 230a may be formed by extending from an edge of the ground plate 220 in which the antenna 210 is installed, to the outside of the ground plate 220, wherein the first vector transformer 230a may be formed in the same plane as the ground plate 220.

An electrical mirror image of the antenna 210 may be generated on the first vector transformer 230a and the first vector transformer 230a may complement the ground plate 220.

Accordingly, the antenna apparatus 200a may have the radiation pattern as illustrated in FIG. 11B.

A radio signal may be radiated from the antenna apparatus 200a in all directions on a xy plane, and the radiation pattern of the antenna apparatus 200a may be similar with the radiation pattern of the monopole antenna.

Figure 12A:
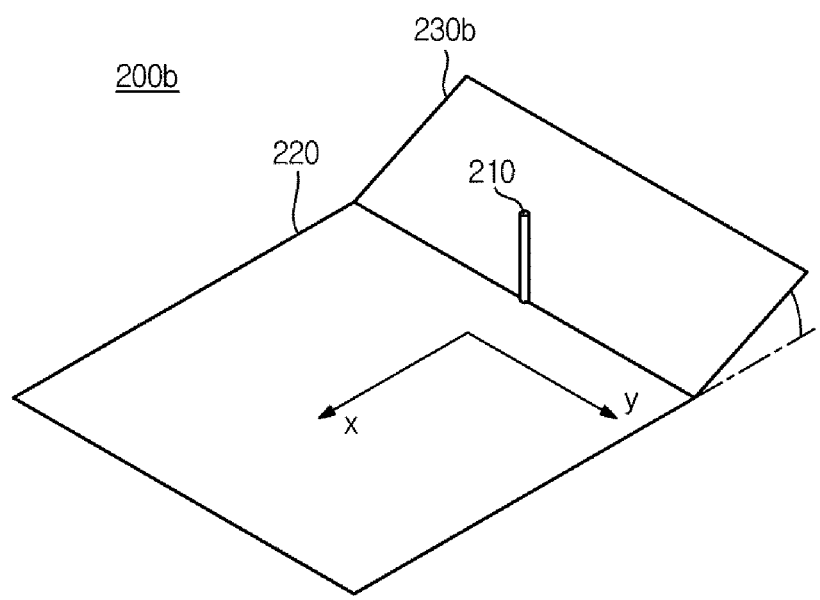
FIGS. 12A and 12B are views illustrating still another example of the antenna apparatus according to an exemplary embodiment of the present disclosure.
Figure 12B:
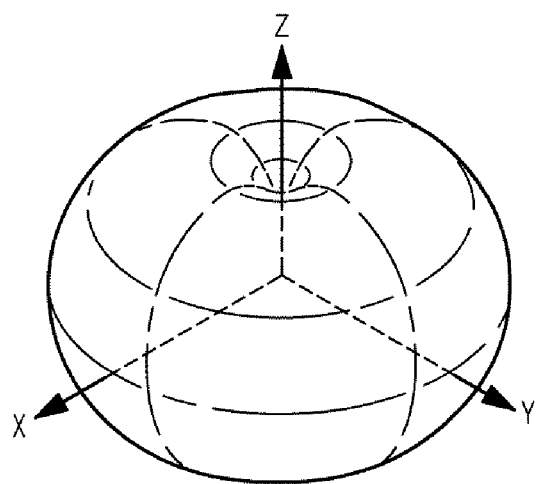

FIGS. 12A and 12B are views illustrating still another example of the antenna apparatus according to an exemplary embodiment of the present disclosure.

As illustrated in FIG. 12A, an antenna apparatus 200b may include an antenna 210, a ground plate 220, and a second vector transformer 230b.

The antenna 210 may transmit and receive a radio signal by being connected to the wireless communication device 139, and the ground plate 220 may provide a ground plane to the antenna 210 by being connected to a ground plane of the vehicle 100. In addition, the ground plate 220 may correspond to the roof panel 113 or the trunk lid 115.

The second vector transformer 230b may be formed by extending from an edge of the ground plate 220 in which the antenna 210 is installed, to the outside of the ground plate 220. The second vector transformer 230b may be extended upward from the ground plate 220 at a predetermined angle θ. In other words, an angle between the second vector transformer 230b and the ground plate 220 may be a predetermined angle θ.

An electrical mirror image of the antenna 210 may be generated on the second vector transformer 230b and the second vector transformer 230b may complement the ground plate 220.

Accordingly, the antenna apparatus 200b may have the radiation pattern as illustrated in FIG. 12B.

A radio signal may be radiated from the antenna apparatus 200b in all directions on a xy plane, and the radiation pattern of the antenna apparatus 200b may be similar with the radiation pattern of the monopole antenna.

As is apparent from the above description, it may be possible to provide a vehicle having a monopole antenna.

It may be possible to provide an antenna apparatus capable of maintaining the performance even when a monopole antenna is installed in a rear side of a roof panel.

Although a few embodiments of the present disclosure have been shown and described, it would be appreciated by those skilled in the art that changes may be made in these embodiments without departing from the principles and spirit of the disclosure, the scope of which is defined in the claims and their equivalents.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A vehicle comprising:
a roof panel;
an antenna disposed on an edge portion of one side the roof panel; and
a vector transformer extending from the edge portion of one side of the roof panel to an outside of the roof panel,
wherein a surface area of the vector transformer is smaller than that of the roof panel,
wherein the vector transformer slantly extends upward from the roof panel at a predetermined angle, and
wherein the vector transformer has a trapezoidal shape in which an upper side of the vector transformer has a length different from that of a base side of the vector transformer.

2. The vehicle of claim 1, wherein at least one side of the vector transformer is overlapped with the roof panel.

3. The vehicle of claim 1, wherein an electrical mirror image of the antenna is generated on the roof panel and the vector transformer.

4. The vehicle of claim 1, wherein the antenna extends from the edge portion of the roof panel to a direction perpendicular to the roof panel.

5. The vehicle of claim 4, wherein an electric field in the antenna is generated in a direction in which the antenna extends, and a magnetic field is generated and rotates around the antenna.

6. The vehicle of claim 1, wherein the antenna includes a monopole antenna such that a radiation pattern of the antenna is the same as a radiation pattern of the monopole antenna.

7. An antenna apparatus comprising:
a ground plate;
an antenna disposed on an edge portion of one side the ground plate; and
a vector transformer extending from the edge portion of one side of the ground plate to an outside of the ground plate,
wherein a surface area of the vector transformer is smaller than that of the ground plate,
wherein the vector transformer slantly extends upward from the ground plate at a predetermined angle, and
wherein the vector transformer has a trapezoidal shape in which an upper side of the vector transformer has a length different from that of a base side of the vector transformer.

8. The antenna apparatus of claim 7, wherein at least one part of the vector transformer is overlapped with the ground plate.

9. The antenna apparatus of claim 7, wherein an electrical mirror image of the antenna is generated on the ground plate and the vector transformer.

10. The antenna apparatus of claim 7, wherein the antenna extends from the edge portion of the ground plate to a direction perpendicular to the ground plate.

11. The antenna apparatus of claim 10, wherein an electric field in the antenna is generated in a direction in which the antenna extends, and a magnetic field is generated and rotates around the antenna.

12. The antenna apparatus of claim 7, wherein the antenna includes a monopole antenna such that a radiation pattern of the antenna is the same as a radiation pattern of the monopole antenna.

* * * * *